Oct. 27, 1936.  A. NOBLE  2,058,491
MEANS FOR DETERMINING MAXIMUM OR MINIMUM TEMPERATURES
Filed Oct. 27, 1934
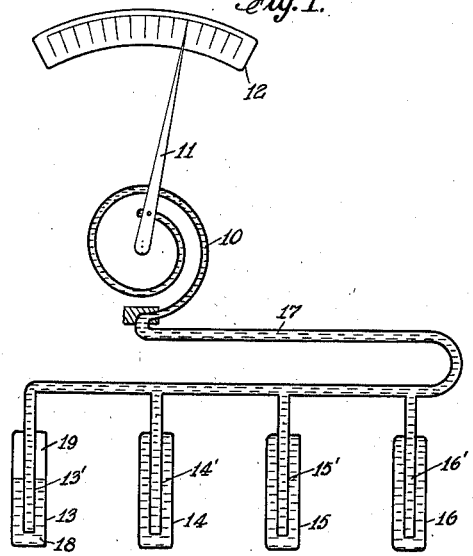
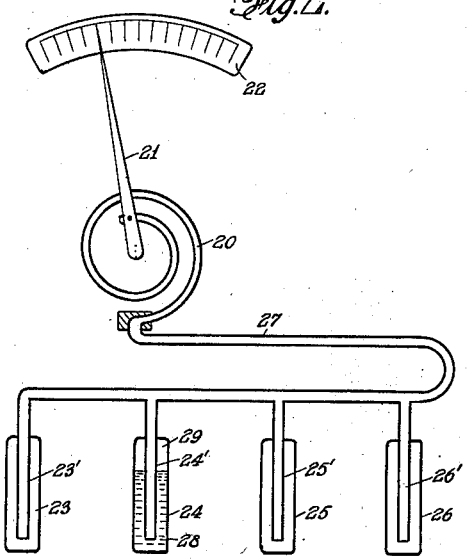
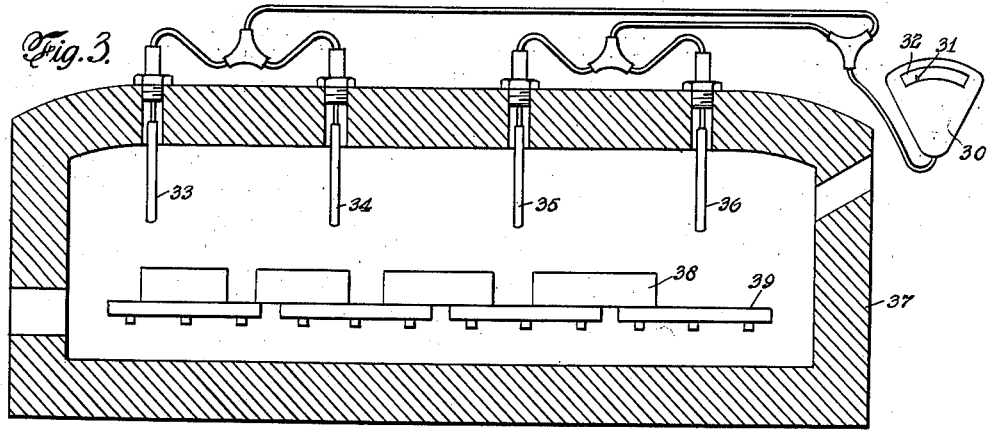
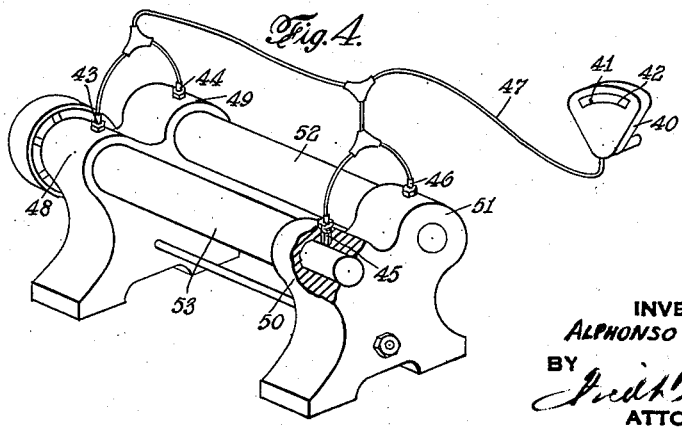
INVENTOR
ALPHONSO NOBLE
BY
ATTORNEY Patented Oct. 27, 1936

2,058,491

UNITED STATES PATENT OFFICE 2,058,491

MEANS FOR DETERMINING MAXIMUM OR MINIMUM TEMPERATURES

Alphonso Noble, Naugatuck, Conn., assignor to The Bristol Company, Waterbury, Conn., a corporation of Connecticut Application October 27, 1934, Serial No. 750,284

6 Claims. (Cl. 73—52)

The invention relates to temperature-measuring devices, and more particularly to that type which is embodied in a closed system including an expansible hollow member, such as a Bourdon spring or metallic bellows, associated with a bulb exposed to a temperature to be measured, a capillary tubing connecting the two, and a volatile liquid filling the whole system. The pressure of vaporization of this fluid will correspond therein to any temperature within the range of measurement and is communicated to the whole interior space of the system, including the expansible hollow member which responds to the variations of this pressure.

In many industrial processes, for example such as embody the use of ovens or vats or the like and of considerable extent, or where there is a group of ovens or vats, to be operated all at a single value of temperature, it frequently occurs that appreciable differences of temperature may prevail among the different points which are supposed to be maintained at the single predetermined temperature. These localized extremes of temperature, which may be due to nonuniformity in the application of a heating or a cooling agent, or to irregular distribution of the material being processed, may be productive of undesirable effects as well as injurious to the material, whether they be high or low.

Again, in the operation of heavy machinery where the journals of running parts are exposed to excessive stresses, it sometimes occurs that one bearing may suddenly develop abnormal heating; and, as such heating is likely to prove cumulative, the bearing may be seriously injured in a very short time as a result of the excessive temperatures to which it may be subjected.

In instances as above noted, it will be apparent that any temperature-measuring device operating under the joint influence of temperature-sensitive means located at several diverse points of measurement will give a measure only of the average temperature at these points and will not be effective in detecting rapidly abnormal and undesirable conditions.

It is an object of the present invention to provide an instrument or measuring system which will afford an indication and/or record and/or control, with alarm or safety device if desired, in response to an extreme temperature prevailing at one point of a group of points at which temperature measurements are undertaken, such measurement being accomplished by taking cognizance thereof without regard for those which are within safe limits.

A further object of the invention resides in the provision of a temperature-measuring system wherein there may be obtained on a single responsive member a measure of the maximum, or the minimum, temperature prevailing at a given time among a plurality of selected points of measurement simultaneously operative therewith.

In carrying out the invention, a vapor pressure system is utilized and which may be described as follows: With an undeformable bulb in communication with a hollow expansible resilient member, such as a Bourdon tube, and partly filled with a volatile liquid, for example xylene or sulphur dioxide, the said Bourdon tube and connection will be filled with liquid and the bulb partly filled when the latter is exposed to a temperature higher than that of the tube or connection thereto, the space above the liquid in the bulb being occupied by vapor. The pressure representing the vapor tension of a liquid corresponding to the temperature to which the bulb is exposed will be equalized throughout the system and be communicated to the said tube which expands and the corresponding deflection obtained will serve as a measure of the temperature.

If the temperature of the bulb should rise, the vapor pressure will correspondingly rise; and, since the system is closed and of substantially constant volume, the new pressure will be communicated to the Bourdon tube and a new deflection obtained. Cooling of the tube, or of the connection between the tube and the bulb, will produce no effect on the vapor pressure within the system, and therefore no effect upon the indication of the instrument.

Again, if the bulb be exposed to a temperature lower than the other parts of the closed system, these parts will be filled with superheated vapor and the pressure in the system will be that at the surface of contact of the vapor with the liquid in the bulb, so that the pressure at all times will be substantially the vapor pressure of the said liquid in the bulb, without respect to the temperature of the other parts of the system. This constitutes the essential principle of the vapor pressure type of thermometer, and no claim is made thereto, the invention residing in the novel arrangement of a plurality of such bulbs connected to a responsive element common thereto with the liquid therein so proportioned that, when one of the bulbs is exposed to an extreme temperature, the surface of contact of the liquid and its vapor will be transferred to that chamber and the corresponding vapor pressure of the liquid will be communicated to the said responsive means.

The nature of the invention, however, will best be understood when described in connection with the accompanying drawing, in which:

Fig. 1 is a diagrammatic view illustrating the novel arrangement as embodied in a system for determining a maximum temperature; and Fig. 2 is a similar view of a system for the determination of a minimum temperature.

Fig. 3 is a longitudinal section illustrating the manner of applying the novel system to an industrial oven; and Fig. 4 is a perspective view illustrating its application to the determination of bearing temperatures.

Referring to the drawing, more particularly Fig. 1 thereof, 10 designates a Bourdon tube or tubular spring of the conventional type, said tube being adapted to respond to an increase of internal pressure, developing within the measuring system, and in a sense to deflect an associated pointer 11 over a scale 12 for affording an indication of the pressure within said tube. The measuring system comprises, in addition, a plurality of closed bulbs 13, 14, 15 and 16 and a connection comprising a capillary tube 17 from these bulbs to the interior of the tube 10. The portions 13', 14', 15' and 16' of the capillary tube entering each of the respective bulbs extend in each instance substantially to the bottom of the particular bulb. Each bulb, furthermore, is more or less filled with a volatile liquid 18, the remaining space 19 being filled with vapor of that liquid, adjusted to a pressure depending upon the range of temperatures which it is desired to measure.

Considering for the moment but a single bulb, as the bulb 13, its performance when subjected to varying temperatures will be substantially as hereinbefore set forth; and vapor pressures corresponding to those temperatures will be communicated to the tube 10, whereby indications will be effected by its pointer 11 with reference to the scale 12.

If now the remaining bulbs 14, 15 and 16 be taken into consideration, it is to be noted that so long as they remain exposed to a temperature lower than that to which the bulb 13 is exposed, the vapor pressure in the system, and corresponding to the temperature to which bulb 13 is exposed, will be communicated to the other bulbs, preventing evaporation therein and producing condensation of any vapor which may tend to exist within the bulbs 14, 15 and 16. Enough liquid will be transferred thereby from the bulb 13 to the remaining bulbs to replace any vapor which may have been condensed.

With all the bulbs 14, 15 and 16 full of liquid, the pressure within the system (providing there still remains liquid within the bulb 13), and hence the indication of the pointer 11 with reference to the scale 12, will be that representative of the temperatures of the hottest of the bulbs, namely the bulb 13. Thus, if the system be filled with liquid to the extent that the volume of vapor present, when all of the bulbs are exposed to the maximum temperature within the range of the instrument, is less than enough to fill one of the series of bulbs, the indication of the pointer will correspond to the maximum temperature to which any one of the bulbs of the system is exposed.

The arrangement indicated in Fig. 2 is substantially similar, embodying the Bourdon tube or spring 20 to deflect a pointer 21 with reference to a scale 22, said tube being connected with a plurality of bulbs 23, 24, 25 and 26 by means of a capillary tube 27. Portions 23', 24', 25' and 26' extend from this capillary tube substantially to the bottom of the respective bulbs; but in the instant embodiment the proportioning of the liquid 28 with reference to the vapor space 29 is altered. That is to say, there is placed within the system only enough of the liquid 28 to partly fill one bulb, as the bulb 24, when it is exposed to the lowest temperature within the range of the instrument.

The performance in this instance will best be understood by first considering but one bulb in a system, when the action will be in all respects similar to that set forth in connection with the embodiment previously described. When, however, the remaining bulbs are taken into consideration, it will be noted that if these are exposed to a temperature lower than that to which the bulb 23 is exposed, the liquid will be transferred into one or more of them, as the bulb 24, until the said bulb 23 contains nothing but vapor.

In the same manner a transfer of liquid will continue to take place until the whole mass of liquid is contained in the bulb which is exposed to the lowest temperature, when the pressure in the system will become equalized at a value corresponding to the temperature to which this bulb is exposed, the vapor remaining in the bulbs exposed to higher temperatures becoming superheated but without increasing pressure. Under these conditions, it will be noted that the pressure existing, and therefore the indication of pointer 21 with reference to scale 22, will represent the minimum temperature of any one bulb in the system.

Fig. 3 illustrates a responsive instrument 30, actuating pointer 31 with reference to scale 32, connected to a plurality of bulbs 33, 34, 35 and 36 which are located at different points along an oven or furnace 37 in which material to be heated is located in suitable containers 38, for example on supports 39. Uniform temperatures are intended to prevail throughout the heating space of this oven; and should a variation from the desired predetermined temperature occur at any portion of this oven, such change will be reflected rapidly by a change in the position of the pointer 31 with reference to its associated scale 32.

Similarly, the responsive measuring instrument 40, actuating a pointer 41 with reference to a scale 42, may be connected to a plurality of bulbs 43, 44, 45 and 46 by a suitable capillary tube 47; and these bulbs are located in bearings 48, 49, 50 and 51, respectively, of, for example, a rolling mill embodying the rolls 52, 53. Should an undue temperature develop at any of the bearings, notice thereof will then be given by the said instrument 40.

It will be understood, of course, that various types of responsive means and bulbs sensitive to temperature variations may be utilized, the invention residing in the particular arrangement of the means for providing a response when the maximum temperature or a minimum temperature prevails at any one of a plurality of measuring locations normally at substantially the same temperature.

It will be understood, furthermore, that the response of the instruments under these conditions may be utilized in various ways to provide an indication, record, actuate a control or energize an alarm or safety device in manner well understood in the art; and that the responsive instrument shown and described is only by way of example and for the sake of simplicity.

I claim:

1. A measuring system for determining a variation, at one location, of a temperature normally uniform among a plurality of locations, said system being of the closed vapor-tension type and comprising an instrument responsive to variations in vapor tension, a plurality of temperature-sensitive bulbs adapted to contain a fluid element in the form of a volatile liquid or its vapor, and means connecting all of the bulbs to said responsive instrument, the amount of liquid in the system, when any one of the bulbs is exposed to an extreme temperature within the range of the instrument, being so proportioned to the combined capacity of all of the bulbs that the liquid or its vapor will be wholly transferred to that bulb and will only partly fill the same.

2. A measuring system for determining a variation, at one location, of a temperature normally uniform among a plurality of locations, said system being of the closed vapor-tension type and comprising an instrument responsive to variations in vapor tension, a plurality of temperature-sensitive bulbs adapted to contain a vaporizable liquid, and means connecting all of the bulbs to said responsive instrument, the amount of liquid in the system, when any one of the bulbs is exposed to an extreme temperature within the range of the instrument, being so proportioned to the combined capacity of all of the bulbs that the vapor will be wholly transferred to that bulb and in a volume insufficient to fill said bulb.

3. A measuring system for determining a variation, at one location, of a temperature normally uniform among a plurality of locations, said system being of the closed vapor-tension type and comprising an instrument responsive to variations in vapor tension, a plurality of temperature-sensitive bulbs adapted to contain a vaporizable liquid, and means connecting all of the bulbs to said responsive instrument, the amount of liquid in the system, when any one of the bulbs is exposed to an extreme temperature within the range of the instrument, being so proportioned to the combined capacity of all of the bulbs that it will be wholly transferred to that bulb and will only partly fill the same.

4. In means for measuring the extreme temperature of a plurality of temperatures, a closed system including a plurality of interconnected bulbs positioned in diverse locations and adapted to be exposed to the temperatures to be measured, said system containing a fluid element in the form of a volatile liquid or its vapor, a pressure responsive element, and tubular means placing said system and pressure-responsive element in communication, whereby under the influence of a pressure differential liquid and/or vapor may pass between respective locations in a sense to transfer the surface of contact of said liquid and its vapor to the bulb which is subjected to the extreme temperature.

5. In means for measuring the maximum temperature of a plurality of temperatures, a closed system including a plurality of interconnected bulbs positioned in diverse locations and adapted to be exposed to the temperatures to be measured, said system containing a fluid element in the form of a volatile liquid or its vapor, a pressure responsive element, and tubular means placing said system and pressure-responsive element in communication, the relative amounts of the liquid and its vapor being so proportioned that the maximum volume of vapor present at any temperature within the range of the instrument is less than the volume of any one of the bulbs.

6. In means for measuring the minimum temperature of a plurality of temperatures, a closed system including a plurality of interconnected bulbs positioned in diverse locations and adapted to be exposed to the temperatures to be measured, said system containing a fluid element in the form of a volatile liquid or its vapor, a pressure responsive element, and tubular means placing said system and pressure-responsive element in communication, the relative amounts of the liquid and its vapor being so proportioned that the maximum volume of liquid present at any temperature within the range of the instrument is less than the volume of any one of the bulbs.

ALPHONSO NOBLE.